UNITED STATES PATENT OFFICE.

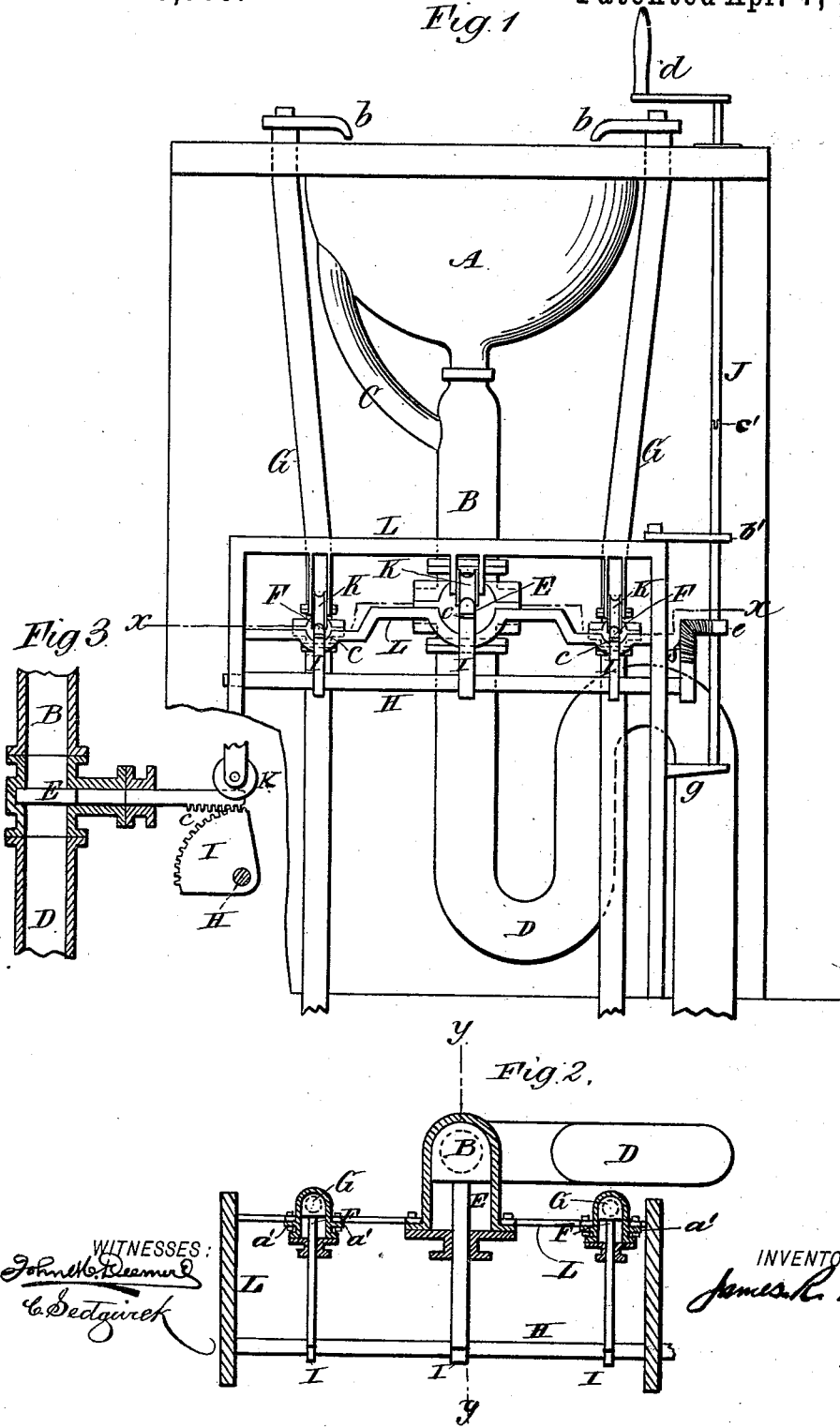

JAMES R. WHITING, OF NEW YORK, N. Y.

WASTE AND WATER PIPE VALVE AND CONNECTION OF WASH-BASINS AND THE LIKE.

SPECIFICATION forming part of Letters Patent No. 449,989, dated April 7, 1891.

Application filed September 14, 1889. Serial No. 323,957. (No model.)

*To all whom it may concern:*

Be it known that I, JAMES R. WHITING, of the city, county, and State of New York, have invented a new and useful Improvement in Waste and Water Pipe Valves and Connections of Wash-Basins and the Like, of which the following is a full, clear, and exact description.

The object of the invention is to afford increased security against the escape of sewer or other noxious gases into buildings through the waste-pipe from wash-basins, bath-tubs, sinks, water-closets, and the like, and at the same time to make it impossible to have an overflow of water from such structures while the waste-pipe is closed by a special valve for the purpose, and, furthermore, to prevent the trap used in connection with such structures from being siphoned.

The invention consists in a novel combination and arrangement of parts, including two or more quickly-closing gate-valves applied to the waste and water or supply pipes of the structure in such way that the waste and water pipes are opened or closed simultaneously, and siphoning of the trap is avoided by the arrangement of the valve in the waste-pipe above the trap, substantially as hereinafter described, and pointed out in the claim.

Reference is to be had to the accompanying drawings, forming a part of this specification, in which similar letters of reference indicate corresponding parts in all the figures.

Figure 1 represents a front view of a wash-basin structure having my invention applied; Fig. 2, a horizontal section upon the line $x$ $x$ in Fig. 1, and Fig. 3 a vertical section upon the line $y$ $y$ in Fig. 2.

A indicates the wash-basin proper, B the waste-pipe, and C the overflow-pipe thereof. D is the trap, E the valve in the waste-pipe, arranged above the trap, and F F the valves in the hot and cold water or supply pipes G G of the basin, which pipes are furnished at their upper ends with the usual basin-cocks $b$ $b$.

When it is only required to supply cold water to the structure—as, for instance, in case of a water-closet—then only one water-supply pipe with its valve F is used, said pipe coming from the tank above the closet.

The valves E and F are what are known as "gate-valves," and open the full size of the pipes to which they are applied. This is important, as also the fact that while they are made to open or close in concert they are independently hung, whereby their liability to stick is reduced. These valves are made to quickly open or close simultaneously by mechanism substantially as follows:

H is a horizontal shaft, upon which are secured toothed sectors or cog-gears I—one for each of the valves E and F. Each of these gears engages with a rack $c$ on the under side of the stem of the valve which it controls, and all are operated in common by an upright shaft J, provided with a handle $d$ above and having a toothed bevel sector or gear $e$ below, arranged to engage with a toothed bevel sector or gear $f$ upon the end of the shaft H. Accordingly as the handle $d$ is turned to the right or left, the valves E and F will by these means be opened or closed. The stems of said valves are guided and prevented from having an upward and lateral motion, as they are drawn out or pushed in, by applying to each one a separate grooved wheel K, arranged over the axis of motion of the actuating-gears I, and whereby a straight and smooth or easy action is secured for the valves.

The boxes or casings of the valves E and F are provided with lugs or projections $a'$, by which they may be bolted or rigidly secured to the main frame L of the structure, which frame is also cast or provided with a foot-rest or bearing $g$ for the lower end of the upright shaft J.

A partial turn only of the crank or handle $d$ will suffice to simultaneously and quickly fully open or close the valves E and F, said valves sliding or moving outward when being opened and sliding or moving inward when being closed by the operating mechanism hereinbefore described. The operating-shaft J is steadied intermediately of its length by a guide $b'$, through which it passes, and it is divided transversely above this guide into upper and lower sections united by a coupling-pin, as at $c'$, whereby the whole valve mechanism may be readily set up and the upper section of the shaft J, having the handle $d$ on it, be passed down through the top of the structure to engage with the lower section of said shaft. When said valves E and F are closed, the valve E in the waste-pipe B hermetically seals the waste-pipe above the trap, thus preventing the escape of all gases into the room and making it impossible to siphon the trap D, which is a source of great danger in the use of stationary wash-basins in bed-rooms, or in the closets adjoining said rooms. The valves F in the water-pipe G being also closed by the same movement as closes the valve in the waste-pipe, water cannot be drawn into the basin.

This invention is applicable in all cases where waste-pipes and water or supply pipes are used, and the addition of my improvement to the ordinary plumbing arrangements under wash-basins, sinks, water-closets, and the like will, when used, make said structures absolutely safe, and when not used will leave said structures as safe as before the improvement was added.

Having thus described my invention, what I claim as new, and desire to secure by Letters Patent, is—

The combination, with the waste-pipe and one or more supply-pipes, of gate-valves in the waste and supply-pipes and provided with racks on their stems, a rock-shaft provided with gears meshing with the racks of the valve-stems, a vertical operating-shaft, and gears on the operating and rock shafts and meshing with each other, substantially as herein shown and described.

J. R. WHITING.

Witnesses:
C. SEDGWICK,
EDGAR TATE.